United States Patent

Kobayashi et al.

[11] 4,033,072
[45] July 5, 1977

[54] HYDROPONIC CULTIVATION APPARATUS

[76] Inventors: Hitoshi Kobayashi, 14-15, Tenjinchou, Koyfu, Yamanashi; Jirou Tatemoto, 10-6, 2 chome Misaki, Koufu, Yamanashi, both of Japan

[22] Filed: Dec. 29, 1975

[21] Appl. No.: 645,076

[30] Foreign Application Priority Data

| Dec. 28, 1974 | Japan | 49-149173 |
| Dec. 28, 1974 | Japan | 49-149172 |
| Feb. 10, 1975 | Japan | 50-016344 |
| Feb. 13, 1975 | Japan | 50-017437 |

[52] U.S. Cl. .................................. 47/62; 47/83
[51] Int. Cl.² .................................. A01G 31/00
[58] Field of Search ............. 47/1.2, 38.10, 38.1, 47/17, 34.12, 59, 60, 62, 79, 83

[56] References Cited

UNITED STATES PATENTS

| 1,031,771 | 7/1912 | Buttschau | 47/1.2 X |
| 2,118,532 | 5/1938 | Widmann | 47/1.2 X |
| 2,131,743 | 10/1938 | Loughridge | 47/1.2 X |
| 2,152,869 | 4/1939 | Campbell | 47/34.12 |
| 2,436,652 | 2/1948 | Lee | 47/1.2 |
| 3,053,011 | 9/1962 | Silverman | 47/1.2 X |
| 3,452,475 | 7/1969 | Johnson, Sr. | 47/34.12 X |
| 3,772,827 | 11/1973 | Ware | 47/1.2 X |
| 3,841,023 | 10/1974 | Carlyon, Jr. | 47/38 |
| 3,943,658 | 3/1976 | Hal | 47/1.2 |

FOREIGN PATENTS OR APPLICATIONS 1,560,632   3/1969   France .................... 47/1.2

*Primary Examiner*—E. H. Eickholt

[57] ABSTRACT

An apparatus for hydroponic cultivation comprising a collector tank for a culture liquid and an upright cultivating tube erected on the collector tank. A plurality of plant holder units are mounted on the cultivating tube and are adapted for receiving cultivating liquid therefrom. A cistern is mounted on the cultivating tube at the top thereof and it contains a siphon generating mechanism. An air mixer in the collector tank is connected to an air pump and serves to mix air with culture liquid to feed the same via a supply pipe to the cistern.

5 Claims, 12 Drawing Figures

FIG. 4
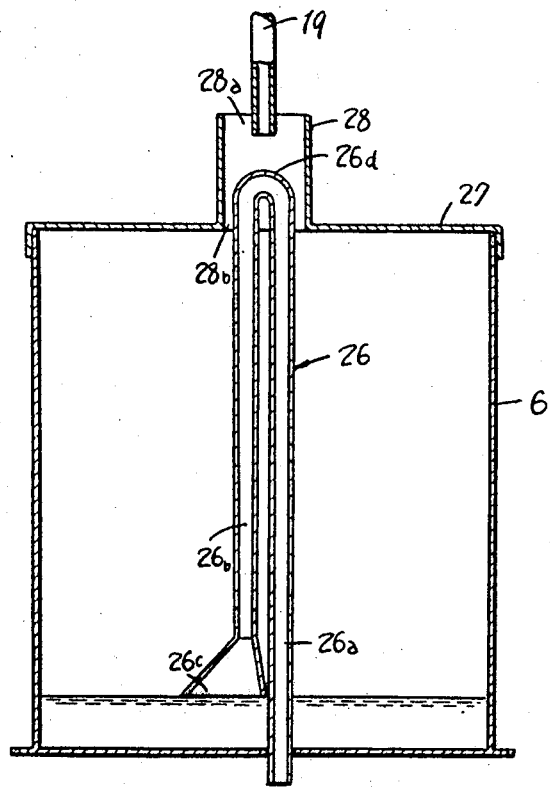
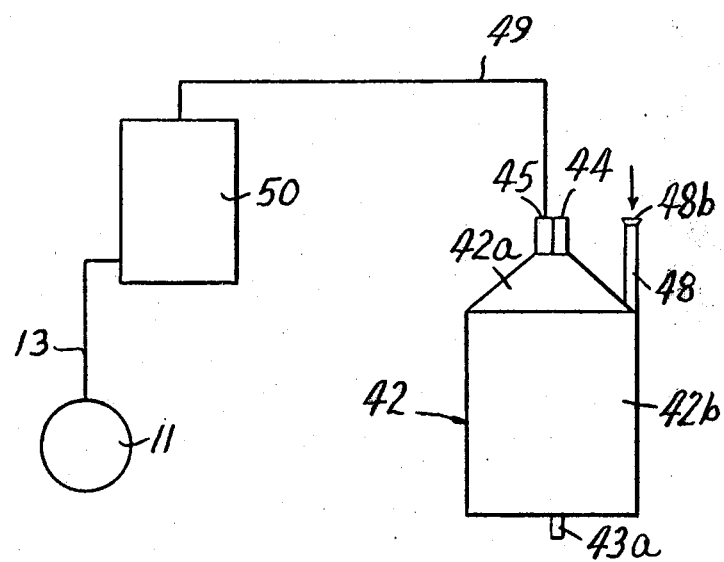
FIG. 12

FIG. 8
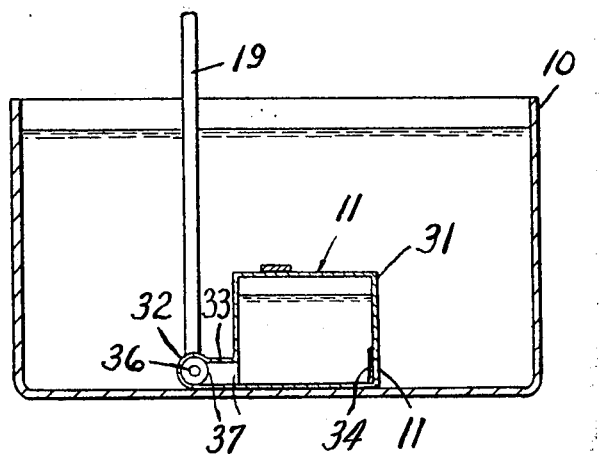
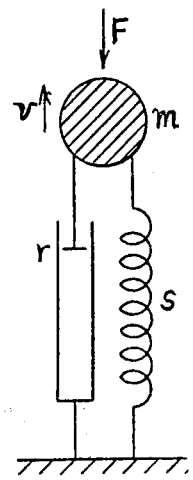
FIG. 6

HYDROPONIC CULTIVATION APPARATUS

This invention relates to the art of hydroponic cultivation

In the prior art, the plant is supported on a cultiviating frame that is horizontally arranged, and the wide space over to horizontal frame is not utilized at all. As the plant to be disposed on a plane is limited in small quantities, it is very difficult to increase the crop per unit area. Generally, it is necessary to provide very wide ground.

The present invention seeks to eliminate defects of plane hydroponics.

It is an object of the invention to increase the crop per unit area. Another object of the invention is to shorten the cultivating cycle. A further object of the invention is to decrease the area of cultivated land.

Numerous other objects and advantages of the present invention will be apparent from a consideration of the following detailed description.

In the accompanying drawings forming a part of this specification, a preferred form of the invention has been illustrated.

In the drawings:

FIG. 4 is a enlarged sectional view of a cistern and a siphon;

FIG. 6 shows a system of dynamic vibration;

FIG. 8 is a sectional view of the mixer taken along line 8 - 8 in FIG. 6;

FIG. 12 is a block diagram of the system using the compressor.

Figure 1:
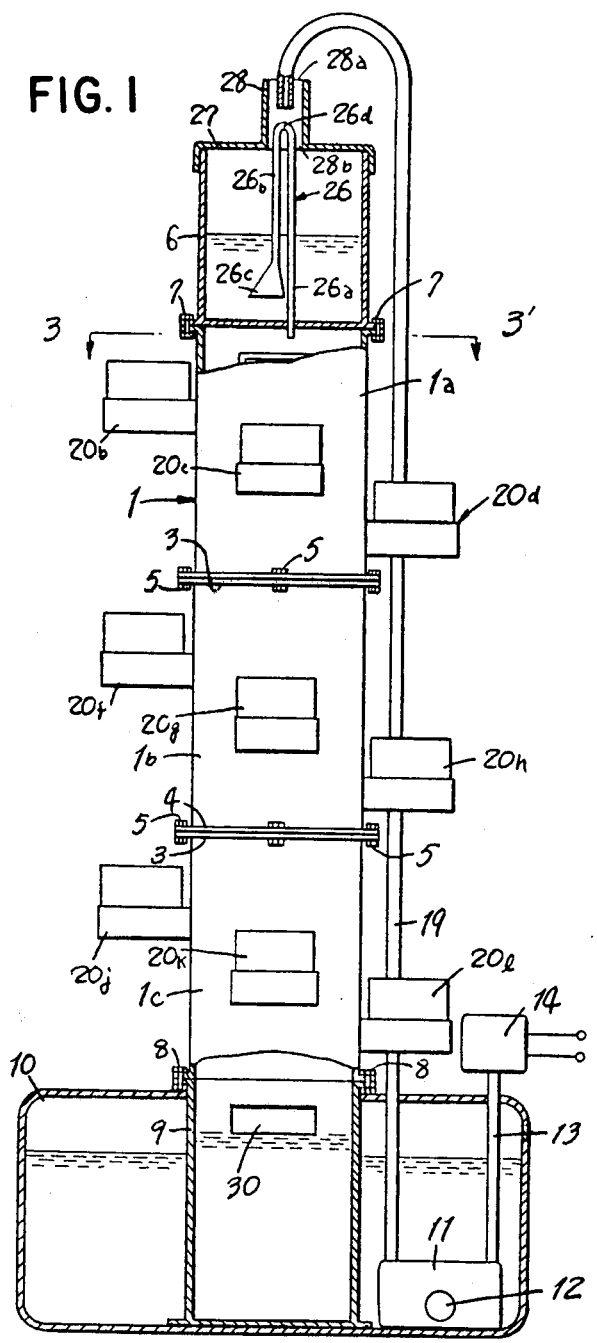
FIG. 1 is a front elevational view of an apparatus for hydroponic cultivation constructed in accordance with the principle of the present invention, partly shown in section.
Figure 2:
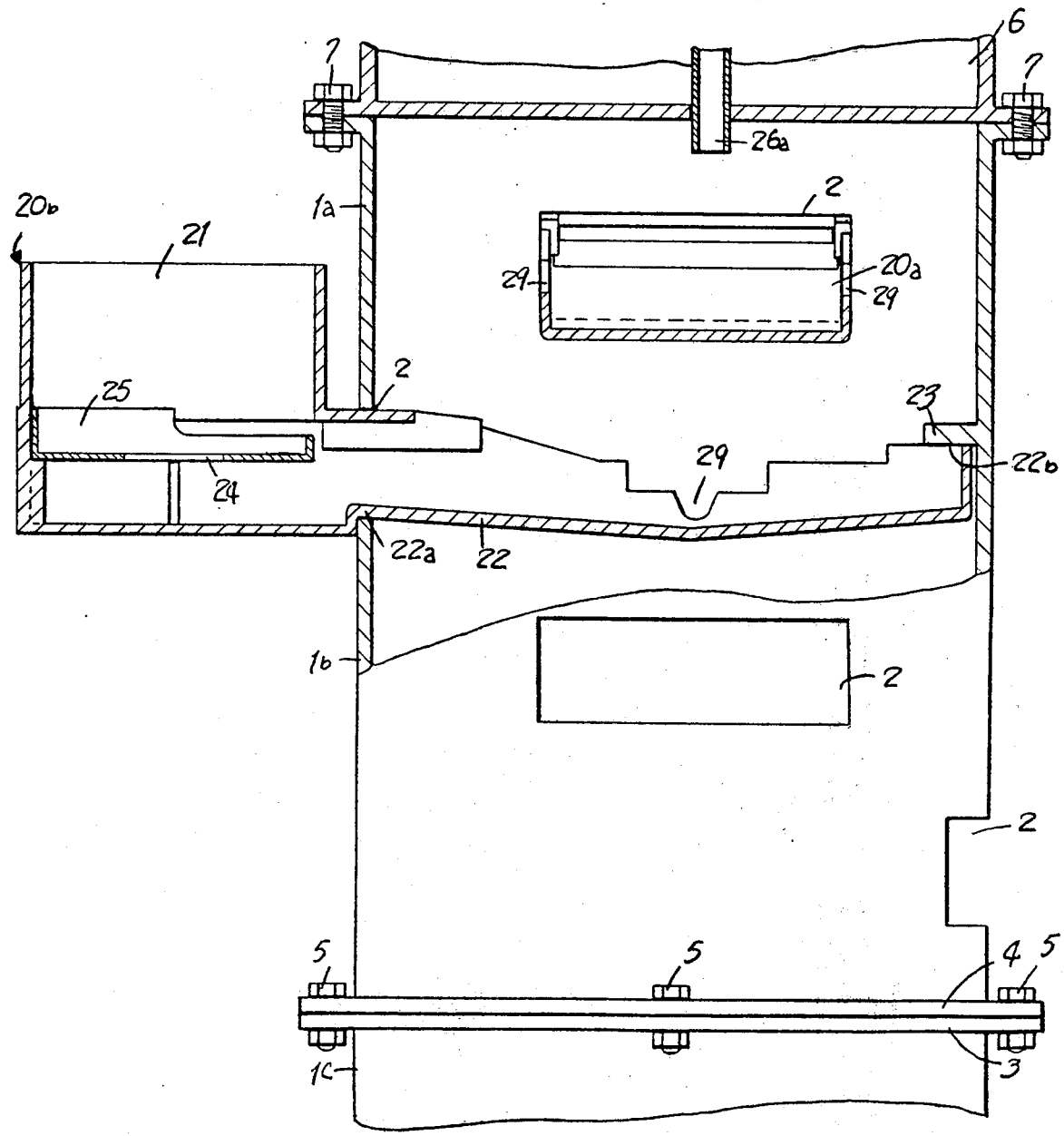
FIG. 2 is an enlarged front elevational view of the apparatus, parts being shown in section.
Figure 3:
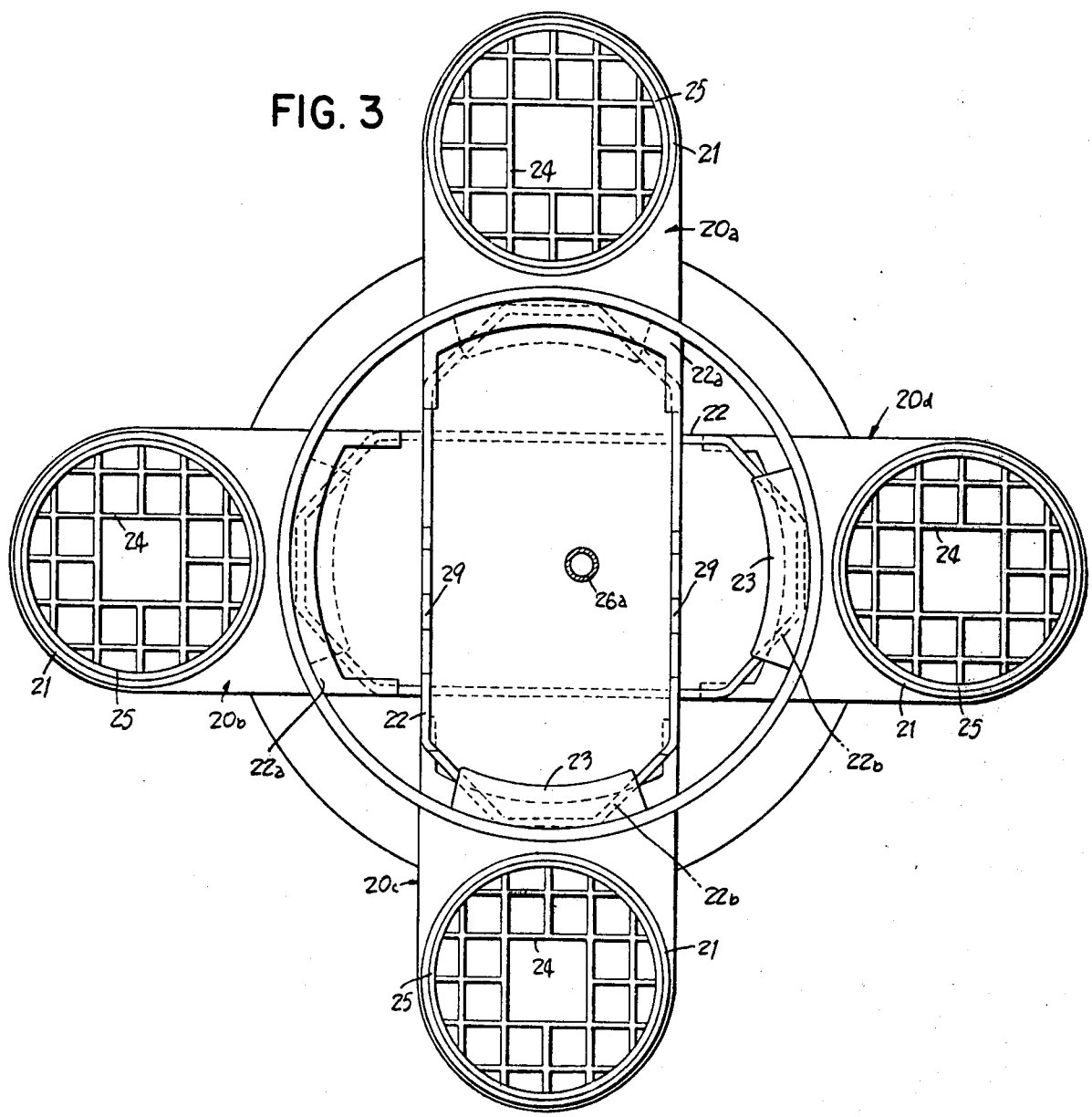
FIG. 3 is a enlarged sectional view taken along line 3 — 3 in FIG. 1.
Figure 5:
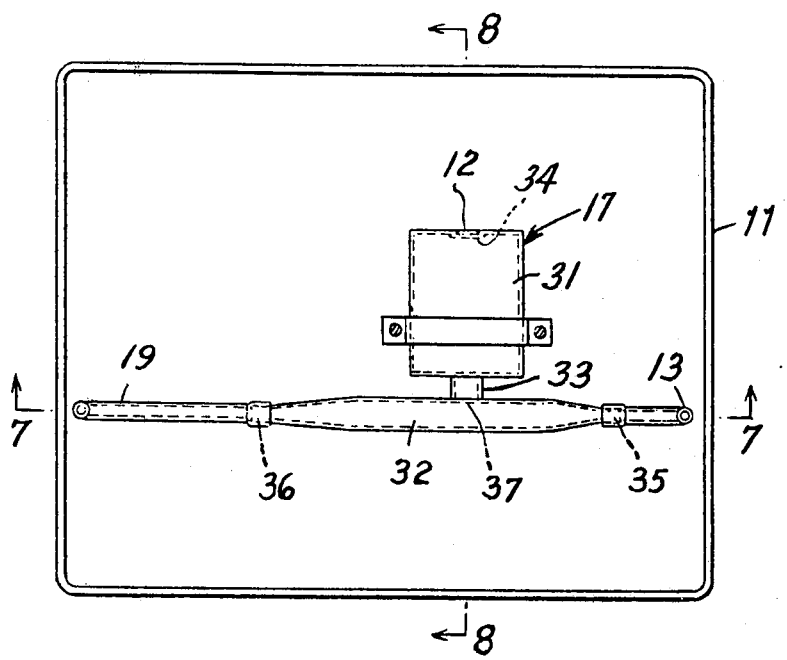
FIG. 5 is a plan view of a mixer that may be used in the apparatus of FIG. 1.
Figure 7:
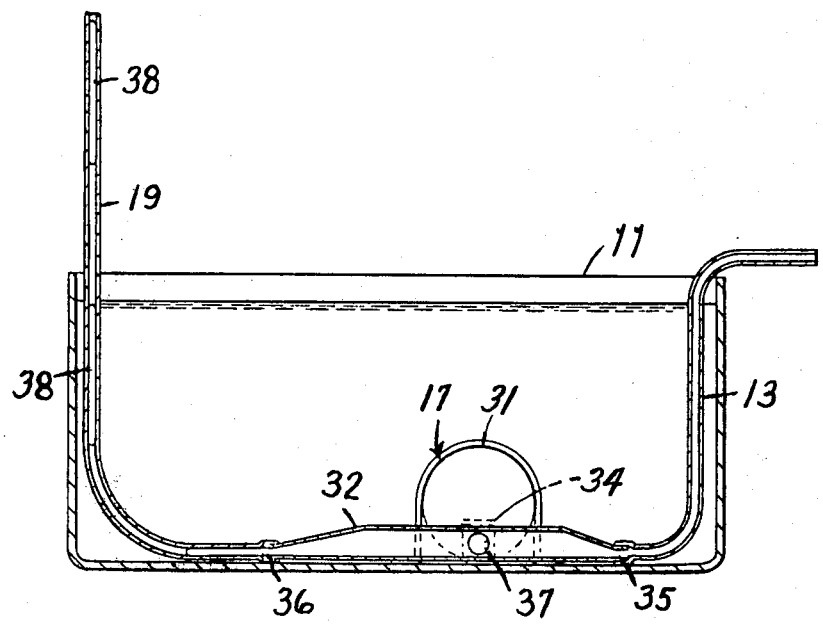
FIG. 7 is a sectional view of the mixer taken along line 7 - 7 in FIG. 6.

Referring now to the drawings in detail, and in particular to FIG. 1, 2, 3 and 4 therein, a cultivating tube 1 stands upright on a filter tube 9 that is erected within a collector tank 10. The cultivating tube 1 is composed of three tube units 1a, 1b and 1c. Each tube unit has four rectangular holes 2, which are disposed at different levels at angular intervals of ninety degrees. The upper tube unit 1a is fixed to the middle tube unit 1b by four bolts 5, which pass through the lower flange 4 of the unit 1a and the upper flange 3 of the unit 1b. The middle unit 1b is attached to the lower tube unit 1c by bolts 5. The lower unit 1c is connected to the filter tube 9 by several bolts 8. A cistern 6 is set on the upper tube unit 1a and attached to it by bolts 7. A mixer 11 is fixed to the bottom of the collector tank 10. A culture fluid flows into the mixer 11 through an inlet 12. An air pump 14 is connected to the mixer 11 by an air pipe 13. The mixer of compressed air and the culture fluid is poured into the cistern 6 by way of a supply pipe 19.

Each plant holder unit 20 consists of a short tubular body 21 and a gutter portion 22. When the gutter 22 is inserted into the cultivating tube 1, one end 22a engages hole 2, and the other end 22b engages a projection 23 formed on the inner surface of the tube 1. A supporting short tube 25 is telescoped into the bottom 21a of the body 21. A latticed bottom 24 of the tube 25 is utilized to assist a seedling in standing. When some spongy material is set into the supporting tube 25, it is possible to sow seed on the material.

A siphon 26 is mounted vertically within the cistern 6, and outlet pipe portion 26a opens in the upper cultivating tube unit 1a almost in the center thereof. The inlet pipe portion 26b has a funnel-shaped inlet 26c, and the curved portion 26d is received in a small tube 28. The small tube 28 projects upwardly on the central portion of the cistern cap 27. The outlet end of said supply pipe 19 is inserted into the upper end 28a that opens to the atmosphere.

When the culture fluid is pumped up, the water level in the inlet pipe portion 26b rises at the same speed as that in the cistern 6. When it reaches the level of the lower end 28b of the small tube 28, it rises very speedily, because there is a substantial difference between the sectional area of the tube 28 and that of the cistern 6. Therefore, the accelerated fluid passes through the curved portion 26d very easily, and flows down to the upper cultivating tube unit 1a by way of the outlet pipe portion 26a. Now, it should be understood that the above-mentioned arrangement ensures effectuation of siphonage.

While the siphon 26 acts, the water level in the cistern 6 continues to fall, as the fluid flows out of the outlet pipe 26a much faster than it enters from the supply pipe 19. When the water level in the cistern 6 falls below the funnel inlet 26c, this inlet 26c is closed with a thin water curtain, which is formed on the annular lower edge thereof owing to surface tension, so that air cannot enter the inlet 26c. When the water curtain is broken at the next instant, a great quantity of air can enter the siphon 26 at once. Therefore, the remainder of the fluid is immediately discharged, and the culture fluid does not flow any longer until the water level in the cistern 6 rises again to that of the curved portion 26d. Namely, the funnel shape of the inlet 26c contributes to stop the siphonage completely. When the cistern 6 is filled with the fluid, a large quantity of the fluid is urged to the curved portion 26d by adding a small quantity of the fluid from the mixer 11. Such a shape of the inlet 26c also ensures effectuation of siphonage.

Thus, a large quantity of the culture fluid flows from the outlet pipe 26a to the gutter 22 of the upper plant holder unit 20a. A certain quantity of the fluid flows to the body 21 of the unit 20a, and the remainder of the fluid falls from overflow ports 29 to the gutter 22 of the lower plant holder unit 20b. The culture fluid exhausted from the cistern 6 is supplied to all of the plant holder units 20, by repeating such a process. Lastly, the fluid flows to said filter tube 9 from the overflow ports 29 of the lowermost plant holder unit 201. The filter tube 9 is provided with an opening 30 on its upper portion. As impurities in the spent fluid deposit on the bottom of tube 9, the pure culture fluid flows into the collector tank 10 through said opening 30, and is re-used.

FIGS. 5 to 8 show the principle of the above-mentioned mixer 11. Mixer 11 is composed of a reservoir 31, a mixing tube 32 and a connecting tube 33. The inlet 12 of the reservoir 31 is equipped with a check valve 34. One end 35 of the mixing tube 32 is connected to the pump 14, and the other end 36 is connected to the supply pipe 19. The mixing tube 32 has a hole, which receives to the connecting tube 33. When compressed air is introduced into the mixing tube 32, the fluid pressure in the reservoir 31 increases, so that the check valve 34 shuts the inlet 12 instantly. The fluid in the mixing tube 32 is urged into the supply pipe 19, as the air pressure in the mixing tube 32 increases to high level by continuous feeding of compressed air. When the fluid portion 38 is exhausted from the pipe 19, the shock of pressure decrease is transmitted to the reservoir 31, so that the check valve 34 moves to open position. The air pressure in the mixing tube 32 increases gradually by said continuous feeding of compressed air, after the fluid is introduced into the mixing tube 32 passing through the inlet 12 and the hole 37. Accordingly, the check valve 34 is again driven to closed position, and said operations are repeated in alternation. There is always a certain quantity of air in the upper space of the reservoir 31.

In the case of the mixer 11, the phenomenon of resonance is used as the principle of mixing and pumping. The air pressure in the mixing tube 32 increases and decreases periodically, as mentioned above. Such a periodic change of the air pressure causes the fluid and air to vibrate in the reservoir 31. The condition of resonance is determined by the capacity of the air pump 14, the inner diameter of the supply pipe 19, the surface tension of the fluid, the position and construction of the check valve 34, the fluid pressure at the check valve 34, the viscosity of the fluid, and the volume of the reservoir 32, etc.. If the reservoir 31 is made of elastic material, it is easy to increase the amplitude of the fluid and air vibration.

Thus, the mixer 11 can lift a large quantity of the fluid up to a great heat. Mixing of air with the fluid can promote solution of oxygen into the fluid. The above contributes to accelerate the growth of the plant.

There is no need to provide any electric power supply, if the air compressor 40 shown in FIGS. 9 to 12 is used in place of the air pump 14. The compressor 40 comprises a tank 42 and a siphon 43. The tank 42 is provided with an entrance port 44 and an exhaust port 45 at the conical top end 42a. A low pressure valve 46 and a high pressure valve 47 are mounted in the entrance port 44 and the exhaust port 45, respectively. The valve 46 moves to the closed position, when air pressure in the tank 42 reaches a pressure $P_1$ that is higher than the atmosphere. The valve 47 moves to the open position, when the interior pressure of the tank 42 rises to pressure $P_2$ that is greater than the pressure $P_1$. Both the valve 46 and the valve 47 are in the form of a ball valve. The ball 47a is much heavier than the ball 46a. Numerals 46b and 47b designate a valve seat. A lattice 46c prevents the ball 46a from dropping. Also, a lattice 47c prevents the ball 47a from escaping.

Figure 9:
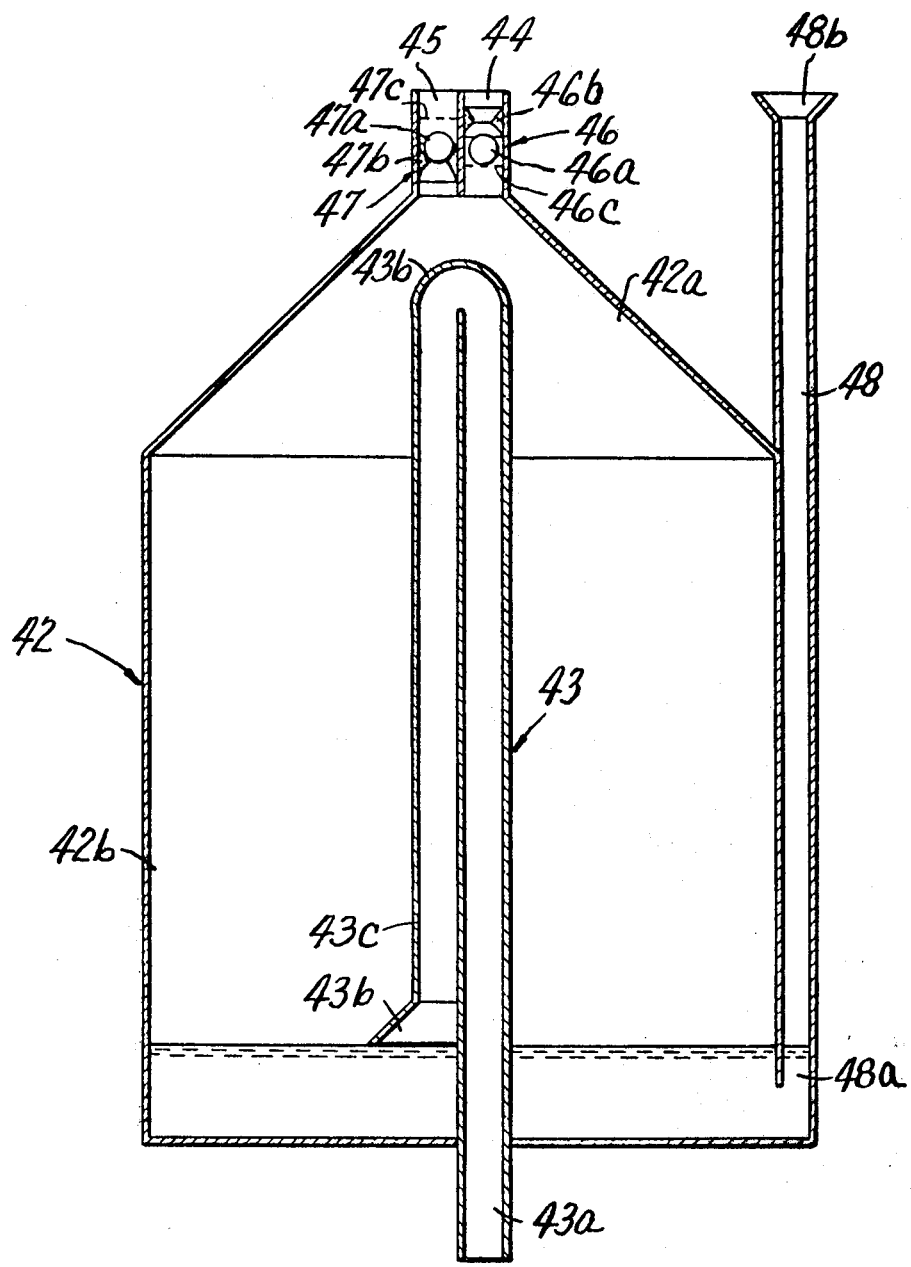
FIG. 9 is a sectional view of a compressor showing the condition after starting.
Figure 10:
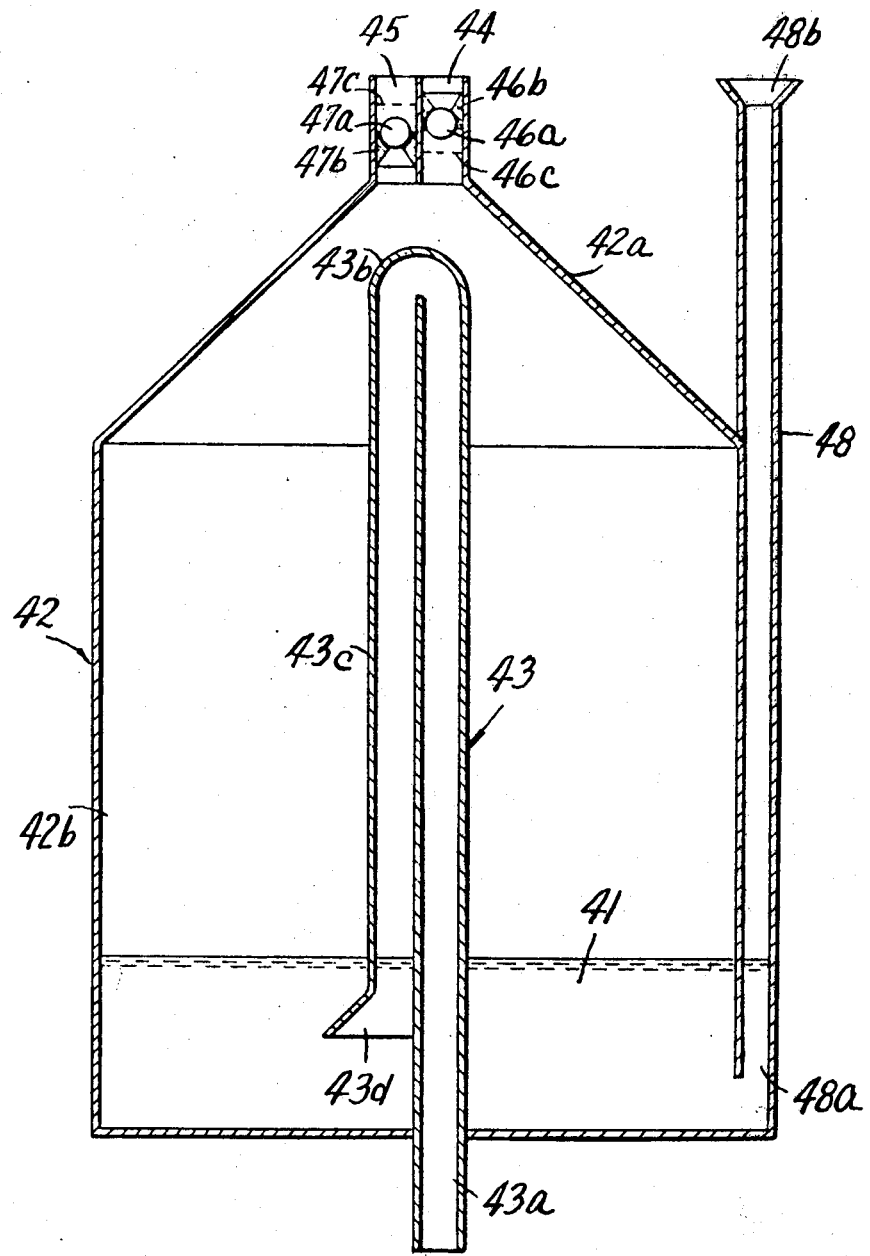
FIG. 10 is a sectional view of the compressor with its ports closed.
Figure 11:
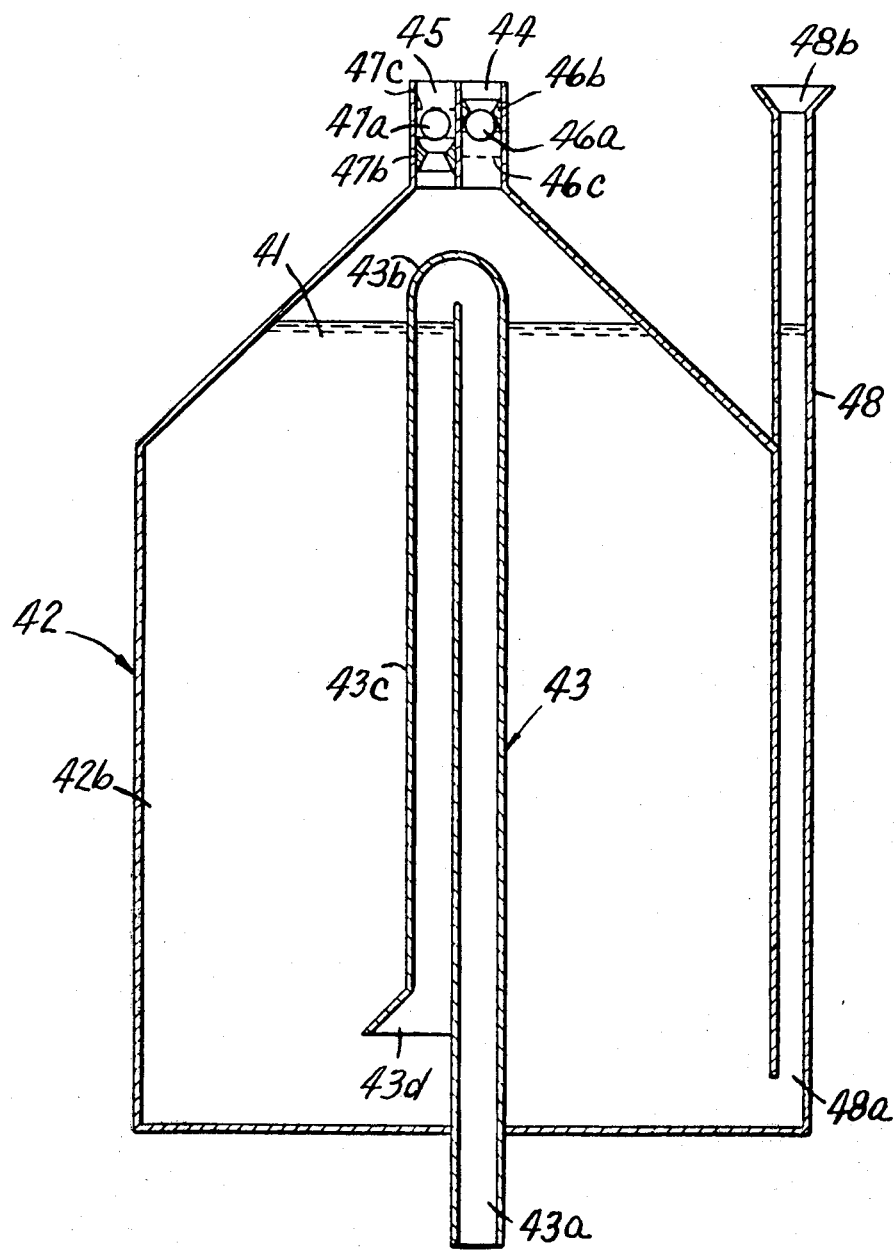
FIG. 11 is a sectional view of the compressor just before siphoning.

Referring to the drawings, FIG. 9 is a sectional view of the above compressor, showing the condition before starting to store the fluid 41. FIG. 10 is a sectional view of the compressor, showing the above ports 44 and 45 closed. FIG. 11 is a sectional view of the compressor, showing the condition thereof just before effectuation of siphonage, and FIG. 12 is a block diagram of the system using the compressor.

The air in the tank 42 is compressed gradually, as the fluid 41 is continuously poured into the tank through a passage 48 having a funnel inlet 48b and a lower outlet 48a. When the air pressure in the tank 42 reaches the pressure level $_1$, the lighter ball 46a rises and contacts the valve seat 46b. In the present stage, both the entrance port 44 and the exhaust port 45 are closed. Therefore, the air pressure increases linearly, as the fluid 41 is further supplied continuously. When the air pressure rises to the level of pressure $P_z$, the ball 47a is raised up to the lattice 47c, so that the compressed air of pressure $P_z$ is exhausted to an accumulator 50 by way of a passage 49. When the water level further rises to the level shown in FIG. 11, the siphon begins to work, so that a large portion of the stored fluid flows down by way of outlet pipe portion 43a. It stops flowing, when the water level falls to the level of the funnel inlet 43d of inlet pipe portion 43c. Then, the above-mentioned storing process starts again. The compressed air is stored in the accumulator 50, and it is supplied to the mixer 11 by way of the pipe 13. The culture fluid can be utilized as the operating fluid 41. The potential energy of the fluid is effectively used in the present air compressor 40.

According to the present invention, space is highly utilized, as a great number of plant holder units 20 are disposed around the cultivating tube 1 erected on the collector tank 10, which occupies only a relatively narrow area. It should be understood that such a high utilization of space enables increase of the crop per unit area, and practice of highly intensive cultivation.

In accordance with the invention, the culture fluid is lifted up to the cistern 6 from the collector tank 10, and a large portion of the fluid stored therein is discharged at once. Such a flush of the fluid can promote the growth of roots, as it agitates the culture fluid within the plant holder unit 20. An air bathing process and a fluid-bathing process are repeated alternately, because the culture fluid is intermittently discharged. Roots are exposed to the atmosphere in the former process, are soaked with the culture fluid in the latter process. The growth of the plant is greatly promoted, because sufficient oxygen for the plant is given to the roots during the above air-breathing process. It is obvious that a shortening of the cultivating period or cycle enables increase in the yield per unit area.

The invention is not to be limited to the exact arrangement of parts shown in the accompanying drawings or described in this specification, as various changes in details of construction may be resorted to without departing from the spirit of the invention. Therefore, only insofar as the invention has particularly been restricted in the accompanying claims, is it to be limited.

What we claim is:

1. Apparatus for hydroponic cultivation comprising a collector tank for a culture liquid, an upright cultivating tube erected on said collector tank, a plurality of plant holder units mounted on said cultivating tube, a cistern mounted on said cultivating tube at the top thereof, air mixing means in said collector tank for mixing air with culture liquid, an air pump connected to said air mixing means, a supply pipe connecting said air mixing means to said cistern, and siphon generating means in said cistern for feeding the liquid in said cistern to said cultivating tube, said cultivating tube being provided with a plurality of holes therealong, each plant holder unit comprising a tubular body and a gutter portion, said gutter portion being detachably inserted in the cultivating tube through a respective said hole to receive culture liquid from a unit thereabove and for discharging culture liquid to a unit therebelow.

2. Apparatus as claimed in claim 1 wherein said siphon generating means comprises a pipe having a funnel-shaped inlet, said cistern having a bottom wall which said funnel-shaped inlet faces.

3. Apparatus as claimed in claim 2 wherein said cistern includes a small tubular portion at the upper end thereof, said pipe of the siphon generating means comprising a curved portion extending into said tubular portion of the cistern, said supply pipe being coupled to said tubular portion of the cistern.

4. Apparatus as claimed in claim 1 wherein said gutter portion has a central section with an overflow port.

5. Apparatus as claimed in claim 1 wherein said cultivating tube comprises a plurality of detachable interconnected tube units.

* * * * *